US009626559B2

(12) United States Patent
Rogers et al.

(10) Patent No.: US 9,626,559 B2
(45) Date of Patent: Apr. 18, 2017

(54) TARGET MARKING FOR SECURE LOGO VALIDATION PROCESS

(71) Applicant: SNAP-ON INCORPORATED, Kenosha, WI (US)

(72) Inventors: Steven W. Rogers, Conway, AR (US); Donald L. Walchuk, Conway, AR (US); Robert J. D'Agostino, Conway, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 3 days.

(21) Appl. No.: 14/322,673

(22) Filed: Jul. 2, 2014

(65) Prior Publication Data
US 2015/0010228 A1   Jan. 8, 2015

Related U.S. Application Data

(60) Provisional application No. 61/842,233, filed on Jul. 2, 2013.

(51) Int. Cl.
*G06K 9/00* (2006.01)
*G01B 11/275* (2006.01)

(52) U.S. Cl.
CPC ...... *G06K 9/00536* (2013.01); *G01B 11/2755* (2013.01); *G01B 2210/30* (2013.01)

(58) Field of Classification Search
None
See application file for complete search history.

(56) References Cited

U.S. PATENT DOCUMENTS

| 5,768,421 A | 6/1998 | Gaffin et al. |
| 6,442,460 B1 * | 8/2002 | Larson et al. ............... 701/32.6 |
| 6,532,304 B1 | 3/2003 | Liu et al. |

(Continued)

FOREIGN PATENT DOCUMENTS

| JP | 8-31009 A | 2/1996 |
| WO | 97/14016 A1 | 4/1997 |

OTHER PUBLICATIONS

Anagnostopoulos, C. N., et al. "Integrated vehicle recognition and inspection system to improve security in restricted access areas." Intelligent Transportation Systems (ITSC), 2010 13th International IEEE Conference on. IEEE, 2010.*

(Continued)

*Primary Examiner* — Sumati Lefkowitz
*Assistant Examiner* — David Perlman
(74) *Attorney, Agent, or Firm* — McDermott Will & Emery LLP

(57) ABSTRACT

The instant application describes a method for acquiring via a vehicle wheel alignment system an image of a target including a validation logo, the validation logo being used for recognition by the vehicle wheel alignment system and determination of authenticity of the validation logo by the vehicle wheel alignment system; identifying the validation logo within the image of the target; comparing the identified validation logo with a reference validation logo; computing a similarity metric based on a result of a comparison between the identified validation logo and the reference validation logo; and based on the computed similarity metric, enabling or disabling the vehicle wheel alignment system.

31 Claims, 4 Drawing Sheets

(56) References Cited

U.S. PATENT DOCUMENTS

| | | | |
|---|---|---|---|
| 6,894,771 B1* | 5/2005 | Dorrance | G01B 11/2755 33/203.18 |
| 8,249,361 B1 | 8/2012 | Steffens | |
| 2002/0191817 A1* | 12/2002 | Sato et al. | 382/118 |
| 2006/0028059 A1* | 2/2006 | Choe | B60B 7/20 301/108.1 |
| 2008/0267441 A1* | 10/2008 | Bux | G01B 11/2755 382/100 |
| 2009/0030558 A1* | 1/2009 | Rogers | G01B 11/2755 700/297 |
| 2009/0173791 A1* | 7/2009 | Pine et al. | 235/454 |
| 2010/0080419 A1* | 4/2010 | Okugi et al. | 382/104 |
| 2013/0294697 A1* | 11/2013 | Nepomniachtchi et al. | 382/192 |

OTHER PUBLICATIONS

International Search Report dated Sep. 26, 2014 issued in International Patent Application No. PCT/US2014/045045.

International Preliminary Report on Patentability dated Jan. 14, 2016, issued in corresponding International Application No. PCt/US2014/045045.

* cited by examiner

TARGET MARKING FOR SECURE LOGO VALIDATION PROCESS

RELATED APPLICATIONS

This application claims the benefit of U.S. Provisional Application No. 61/842,233 Filed Jul. 2, 2013 entitled "TARGET MARKING FOR SECURE IDENTIFICATION BY A CAMERA SYSTEM" the disclosure of which also is entirely incorporated herein by reference.

BACKGROUND

The basic art of vehicle wheel alignment using imaging cameras and targets has become commonplace in the industry. A variety of target configurations have been introduced by the practitioners of the art with the most common being a flat plane containing highly visible shapes arranged in known or determined relative orientations to each other on the plane. The software algorithms of each wheel alignment system is designed to view these targets and through various methods, determine the wheel alignment angles necessary to determine the in or out of spec condition of the vehicle wheel alignment. While it is possible to look at the targets produced by the various practitioners and make some assumptions regarding their original manufacturer, it is not currently possible to easily and conclusively identify a copied target. Furthermore, it is currently possible for a copied target to be introduced into a proprietary wheel alignment system.

Intellectual property piracy is a pervasive problem in wheel alignment systems and pirated versions of alignment systems have been found around the world. The challenge of quickly and conclusively identifying a copied wheel alignment system has been an ongoing problem. Hence, a need exists to visually identify that a wheel alignment system is a copied system and make it impossible to directly copy the alignment system operating software or firmware and enable a functional alignment system without the visual identification being present.

SUMMARY

In one general aspect, the instant application describes a method that includes acquiring via a vehicle wheel alignment system an image of a target including a validation logo, the validation logo being used for recognition by the vehicle wheel alignment system and determination of authenticity of the validation logo by the vehicle wheel alignment system; identifying the validation logo within the image of the target; comparing the identified validation logo with a reference validation logo; computing a similarity metric based on a result of a comparison between the identified validation logo and the reference validation logo; and based on the computed similarity metric, enabling or disabling the vehicle wheel alignment system.

The above general aspect may include one or more of the following features. Acquiring the image of the target may include acquiring the image of the target via a camera of the vehicle wheel alignment system. The method may further include performing a projective transformation of the image of the target to facilitate comparison of the image of the target and the reference validation logo. The projective transformation may include transforming the image of the target to match an orientation of the reference validation logo in a camera image plane. The method may further include cropping the validation logo from the image of the target, wherein the validation logo is a copyrighted mark and distinct within the image of the target. The method may further include resizing the validation logo to be substantially same size as the reference validation logo. The method may further include resizing the validation logo to be same size as the reference validation logo.

Enabling or disabling the vehicle wheel alignment system may include enabling the vehicle wheel alignment system upon determining the similarity metric exceeds a threshold, confirming the validation logo authenticity. Alternatively, enabling or disabling the vehicle wheel alignment system may include disabling the vehicle wheel alignment system upon determining the similarity metric does not exceed a threshold, confirming the validation logo unauthenticity. Computing the similarity metric may include computing a correlation coefficient based on the result of the comparison between the identified validation logo and the reference validation logo.

In another aspect, the instant application describes a wheel alignment system that includes a processing device; and a memory storing executable instructions for causing the processing device to: acquire an image of a target including a validation logo, the validation logo being used for recognition by the vehicle wheel alignment system and determination of authenticity of the validation logo by the vehicle wheel alignment system; identify the validation logo within the image of the target; compare the identified validation logo with a reference validation logo; compute a similarity metric based on a result of a comparison between the identified validation logo and the reference validation logo; and based on the computed similarity metric, enable or disable the vehicle wheel alignment system.

The above general aspect of the vehicle wheel alignment system may include one or more of the following features. The wheel alignment system may include at least one camera, wherein to acquire the image of the target the memory may further include instructions for causing the processing device to acquire the image of the target via the at least one camera of the vehicle wheel alignment system. The memory may further include instructions for causing the processing device to perform a projective transformation of the image of the target to facilitate comparison of the image of the target and the reference validation logo. The projective transformation may include transforming the image of the target to match an orientation of the reference validation logo in a camera image plane. The memory may further include instructions for causing the processing device to crop the validation logo from the image of the target, the validation logo being a copyrighted mark and distinct within the image of the target.

The memory may further include instructions for causing the processing device to resize the validation logo to be substantially same size as the reference validation logo. To enable or disable the vehicle wheel alignment system the memory may further include instructions for causing the processing device to enable the vehicle wheel alignment system upon determining the similarity metric coefficient exceeds a threshold, confirming the validation logo authenticity. To enable or disable the vehicle wheel alignment system the memory may further include instructions for causing the processing device to disable the vehicle wheel alignment system upon determining the similarity metric does not exceed a threshold, confirming the validation logo unauthenticity. To compute the similarity metric the memory may further include instructions for causing the processing device to compute a correlation coefficient based on the result of the comparison between the identified validation logo and the reference validation logo.

In another general aspect, the instant application describes a method that includes acquiring via a vehicle wheel alignment system an image of a target used for aligning a vehicle; determining whether a validation logo is present within the image of target, the validation logo being used for recognition by the vehicle wheel alignment system and determination of a source of origin of the vehicle wheel alignment system; and based on the determination result, enabling or disabling the vehicle wheel alignment system.

The above general method aspect may include one or more of the following features. Acquiring the image of the target may include acquiring the image of the target via a camera of the vehicle wheel alignment system. Determining whether the validation logo is present may include: identifying a portion of the image of the target that should contain the validation logo; comparing properties of the identified portion with a reference validation logo; computing a similarity metric based on a result of a comparison between the properties of the identified portion and the reference validation logo; based on the computed similarity metric, determining whether the validation logo is present within the image of the target.

The method may further include performing a projective transformation of the image of the target to facilitate comparison of the image of the target and the reference validation logo. The projective transformation may include transforming the image of the target to match an orientation of the reference validation logo in a camera image plane. The method may further include cropping the portion of the image of the target that should include the validation logo from the image of the target, wherein the validation logo is a copyrighted mark and distinct within the image of the target. The method may further include resizing the cropped portion to be same size as the reference validation logo. Enabling or disabling the vehicle wheel alignment system may include enabling the vehicle wheel alignment system upon determining the similarity metric exceeds a threshold, determining the validation logo is present in the image of the target. Enabling or disabling the vehicle wheel alignment system may include disabling the vehicle wheel alignment system upon determining the similarity metric does not exceed a threshold, determining the validation logo is not present in the image of the target.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

When a wheel alignment system is equipped with the present teachings, the system may be immediately recognizable as being proprietary and, by inference, to be operated with proprietary alignment software. Conversely, an attempt to copy and use proprietary alignment software will be exposed by the need for the unique mark/logo on the target surface. The mark/logo may be visible to the naked eyes and/or the wheel alignment system. Alternatively, the mark/logo may have to be enhanced in size to be visible to the naked eyes and/or wheel alignment system.

One way to allow for a quick and positive identification of a vehicle wheel alignment system as being proprietary is to include a unique and proprietary identifying logo as a visible part of a target used in a wheel alignment system to identify the proper alignment of the vehicle. For example, the identifying logo can be included as a part of the target that is immediately visually recognizable as being indicative of proprietary ownership. Further, the aligner software can be configured to recognize the unique and proprietary logo and disable the alignment system functionality if the required logo is not present on the target. To this end, if the unique logo is removed from the target in an attempt to hide the piracy of the propriety alignment software, the software will not function properly.

Reference now is made in detail to the examples illustrated in the accompanying drawings and discussed below.

Figure 1:
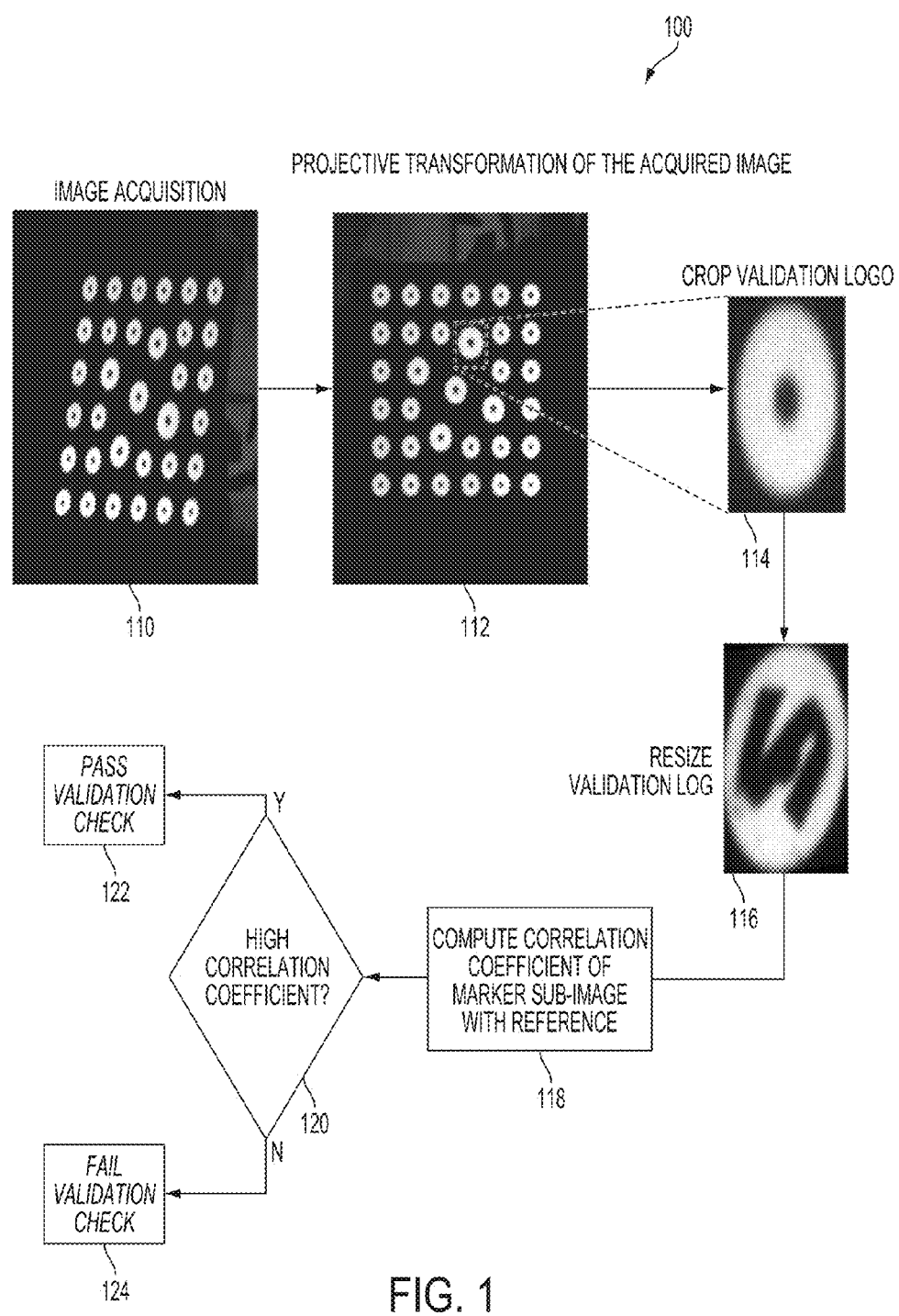
FIG. 1 illustrates an exemplary process for performing a logo validation check in a wheel alignment system.

FIG. 1 illustrates an exemplary process 100 for performing a logo validation check in a wheel alignment system. The process 100 begins with the wheel alignment system such as wheel alignment system shown in FIG. 2 acquiring an image of a target (Step 110). The target may or may not contain a validation logo. If the target includes the validation logo, the validation check may be considered passed. If the target does not include the validation logo, the validation check may be considered not passed. The validation logo may be an object placed in the field of view of an imaging system of the vehicle wheel alignment system for use as a point of reference. It may be something placed into or on the target (imaging subject). The validation logo can be any unique symbol identifying the manufacture of the wheel alignment system and/or identifying the proprietary nature of the wheel alignment system. In one implementation, the validation logo is a copyrighted logo associated with the manufacturer of the wheel alignment system.

To illustrate one specific example, the target may include a rectangular flat and black plate with a pattern of white circles marked on or mounted on the surface of the black plate. The shown image is of the plate at 230" and 0 degrees tilted back. The white circles may be differently sized and may be located at different positions on the black plate. Each white circle may include a black center (hollowed out center) within it and the validation logo may be present within the black center. The center may be of 22 or so pixels in diameter. In one implementation, the validation logo may be immediately visible to the naked eye such that the user can immediately recognize the while circle that includes the validation logo. In another implementation as shown in FIG. 1, the validation logo may be smaller in size and not visible to the naked eyes and may have to be enhanced in size to be visible to the naked eyes or the camera of the wheel alignment system. As shown, in FIG. 1, after resizing the validation logo, it is shown to be of a tilted "S" shape overlapping the black center of the white circle.

Moving forward, upon acquiring the target image (Step 110), the logo validation process 100 proceeds to a projective transformation of the acquired image of the target (Step 112). While not absolutely essential to the logo validation process 100, the projective image transformation may be a key step in providing for an accurate and user friendly way of carrying out the logo validation process 100. The transformation may digitally transform the validation logo image to match the orientation of a reference validation logo in the camera image plane of the wheel alignment system. In one specific example, the transformation may include making the image of the target "right-side-up" and normal with the camera image plane. Alternatively, the transformation may include making the image of the target "left-side-up" and normal with the camera image plane. In either case, the transformation may be performed to facilitate comparison of the target image with the reference template (which may have also been projectively transformed).

The reference template may include the reference validation logo image. The task is to find the transformation that orients the validation logo sub-image included in the target image to the correct rotation with respect to the reference validation logo image. This transformation is known as a homography. There are several different ways of computing the projective transformation. Since the observation target geometry is known, one could compute the pose (position and orientation) of the target with respect to the camera and then deduce the projective transformation from that pose estimate. This may require, however, that the observation camera be calibrated in an offline process prior to performing the logo validation check. An alternative approach that does not require a calibrated camera is to compute the projective transformation matrix directly from 2D image measurements and from known 2D target reference geometry points. The image measurements are obtained by image processing algorithms. In the method depicted above, they are obtained by finding the centroids of the circular regions of the image, but the application is not limited to such methods and other alternatives are contemplated. The reference target geometry points are known a priori as the target has been fabricated to the specifications. The image measurements may correspond directly to known target reference geometry points. Both sets of 2D points (image measurements and target geometry points) may lie in planes. This type of 2D plane to 2D plane transformation is known as a homography transformation, and is encoded in a 3×3 matrix.

The task is thus to find the transformation "H" that best maps image points $(x_i, y_i)$ to their corresponding points $(X_i, Y_i)$ in the target coordinate system:

$$\begin{bmatrix} X_i \\ Y_i \\ 1 \end{bmatrix} \sim H \begin{bmatrix} x_i \\ y_i \\ 1 \end{bmatrix}$$

H is a 3×3 homography matrix that transforms points in the image coordinate system (pixels) to their corresponding points in the target coordinate system (physical dimension units). There are 9 elements in H but only 8 degrees of freedom. H can be estimated via the matrix pseudo-inverse, eigenvector decompositions, the singular value decomposition, or other numerical linear algebra techniques. It can also be estimated from iterative methods such as gradient descent, Levenberg-Marquardt, parabolic minimization, or other methods. The specific method used to generate the homography may not be material.

After the projective transformation (Step 112), the logo validation process 100 proceeds to identify a validation logo in the transformed target image. The validation logo may be distinct from other markers within the target image. For example, as shown, the target may include circles of various diameters and the reference logo is located in one of the circles. In one specific example, the system previously knows the radius of each circle including the radius associated with the circle including the validation logo image and identifies the circle including the validation logo based on the radius information. For another example, the system may include information identifying the circle including the validation logo as the one located in the second row and forth column among the matrix of circles shown in FIG. 1. In another example, the circle including the validation logo is identified based on its relationship with other circles. Specifically, the circle including the validation logo may be identified based on its distance to the other circles. This information may be previously stored in the system.

Once identified, the validation logo may be cropped from the target image (hereinafter referred to as "validation logo sub-image") (Step 114). This is because, in one implementation, this is the only portion of the target image that is of interest in the logo validation process 100. The cropped portion, as shown in FIG. 1, may include the white circle including the validation logo.

The cropped validation logo sub-image is then resized to be substantially the same size or the same size as the reference validation logo image (Step 116). This may be done to provide a direct pixel-to-pixel comparison between the validation logo from the target image (which may or may not contain the validation logo) and the reference validation logo in the reference image. In one implementation, the compared images may need to have the same number of pixels. However, this step is not essential and may only be performed for a correlation coefficient computation between the two compared images as described further below.

Once the validation logo sub-image is the same size as the reference validation logo image, they are compared with each other and a correlation coefficient between the two images is computed (Step 118). The correlation coefficient may indicate the degree of similarity between the validation logo sub-image and the reference validation logo image and it may form the basis of the target authenticity check as described further below. The correlation coefficient may be computed based on the following formula:

$$\mathrm{Corr}(I_M, I_L) = \frac{\mathrm{Cov}(I_M, I_L)}{\sqrt{\mathrm{Var}(I_M)\mathrm{Var}(I_L)}},$$

where: $I_M$ is the validation logo sub-image to be compared against the reference validation logo image; $I_L$ is the reference validation logo image which serves as the validation check reference; $\mathrm{Cov}(I_M, I_L)$ is the covariance of the validation logo sub-image with the reference validation logo image (e.g., how the validation logo sub-image intensity changes with respect to changes in the reference validation logo mage); $\mathrm{Var}(I_M)$ and $\mathrm{Var}(I_L)$ are the variances of image intensities in the validation logo sub-image and the reference validation logo image, respectively.

Moving forward, based on the correlation coefficient, the logo validation process 100 determines whether there is a high degree of correlation between the validation logo sub-image and the reference validation log image (Step 120). If there is a high degree of correlation between the validation logo sub-image and the reference validation logo image (Step 120, Yes), then the logo validation process 100 outputs an indication that the validation check has passed (e.g., the validation logo is present in the target image) (Step 122). Otherwise (Step 120, No), the logo validation process 100 outputs an indication that the validation check has failed (e.g., the validation logo is not present in the target image) (Step 124). To this end, the correlation coefficient may be compared with a threshold value and if the correlation coefficient is equal to or exceeds the threshold value, the logo validation process 100 determines that that the validation logo is present in the target image, reflecting a pass validation check (Step 122). Otherwise, if the correlation coefficient is less than threshold value, the logo validation process 100 determines that a correct validation logo is not present in the target image, reflecting a fail validation check (Step 124).

Figure 2:
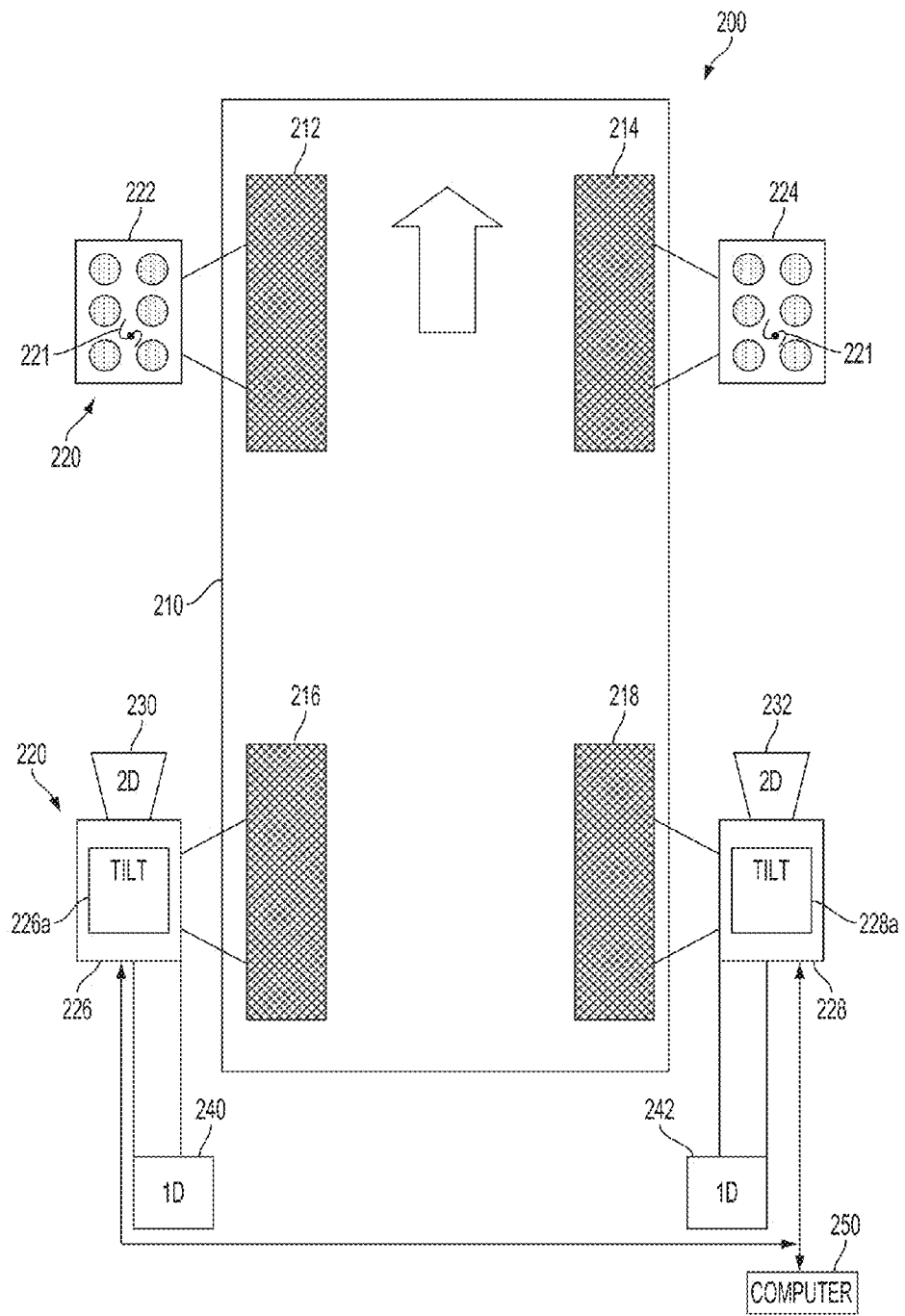
FIG. 2 illustrates an exemplary system including a vehicle and a wheel alignment system configured to perform the logo validation process shown in FIG. 1.

FIG. 2 illustrates an exemplary system 200 including a vehicle 210 and a wheel alignment system 220 configured to perform the logo validation process 100 shown in FIG. 1. The wheel alignment system 200 shows an exemplary arrangement of targets and active sensing heads of the wheel alignment system 220 in relation to wheels of the vehicle 210 that is under test, e.g. to measure one or more wheel alignment parameters. Except for the wheels, elements of the vehicle are omitted for ease of illustration.

The wheel alignment system 220 includes at least one camera and one target. In the illustrated implementation, the wheel alignment system 220 includes two cameras and two targets. The wheel alignment system 220 may be configured to perform a live check of the presence of a validation logo on the target. Before this test can be conducted, several preliminary steps may be taken. First, the validation logo may be designed. The validation logo 221 may be of variety shapes and forms. For example, as shown in FIG. 2, the validation logo 221 may be of a titled "S" shape. In yet another alternative, the validation logo may be stylized "X" reference design. Once designed, the validation logo may be placed on the target such that it is visually identifiable to the wheel alignment system 220 in use.

A reference validation logo may then be designed. Once the validation logo is designed, a corresponding template image of the validation logo (e.g., a reference validation logo) and its characteristics may be stored in the wheel alignment system 220. This information may be stored for example in the camera(s) of the wheel alignment system 220 and may later be used by the wheel alignment system 220 for determining the existence of the validation logo on the target to enable and disable the wheel alignment system 220.

The targets may then be fabricated with the designed validation logo present on the target. The processing computer may then be "trained" to identify this validation logo on the target surface in an offline process. One of ordinary skill in the art knows how to perform these steps and therefore for the sake of simplicity and brevity of description they are not described here in more detail. With the design, fabrication, and "training" process completed, the live validation logo check can then be performed in real operation scenarios.

The wheel alignment system 220 includes a pair of passive heads 222 and 224 mounted on respective wheels 212 and 214 of the vehicle 210, which are front steering wheels in this first example. The wheel alignment system 220 also includes a pair of active sensing heads 226 and 228. The active sensing heads 226 and 228 are adapted for mounting in association with other respective wheels 216 and 218 of the vehicle 210, in this case the rear wheels. The active sensing heads 226 and 228 respectively include an image sensor 230 and 232 for producing image data, which is expected to include an image of a passive target 222, 224 when the various heads are mounted to the respective wheels of the vehicle 210. In this first example, the image sensors 230 and 232 in the active sensing heads 226 and 228 respectively are two dimensional (2D) imaging devices, e.g. cameras.

The passive heads 222 and 224 are passive in that they include targets but do not include any sensing elements. Each of the passive heads 222 and 224 includes a target of a type that may be observed by one of the image sensors 230 or 232 in the active heads 226 and 228, respectively. A passive target is an element that is not driven by power and does not emit energy for detection by a sensor. In one implementation and keeping with the previous example, the passive target includes a validation logo. The validation logo may be an object placed in the field of view of an imaging system 230 and 232 of the vehicle wheel alignment system 220 for use in a logo validation process. The validation logo may be a unique identifiable maker. The unique identifiable marker may be used for recognition by the wheel alignment system 220 and determination of authenticity of the target 222, 224 for purposes of enabling or disabling further functioning of the wheel alignment system 220. The validation logo can be any unique symbol that can identify the proprietary nature of wheel alignment system 220. In one implementation, the reference logo is a copyrighted symbol 221 associated with the manufacturer of the wheel alignment system 220.

Assuming an image sensor in head 226 or 228, a passive target 222 or 224 would be an object that reflects (or does not reflect) light or other energy in a manner detectable by the respective image sensor. The target may take variety of shapes and forms. In the illustrated example, the targets 222 and 224 include light and dark regions that can be detected when illuminated by other sources and imaged by cameras or the like in the active sensing heads 226 and 228. For example, the target may be in the form of a rectangular black plate as shown in FIG. 1 with different sized white circles positioned within the rectangular black plate. Alternatively, as shown in FIG. 2, the target may be a rectangular white plate with black circles positioned within the rectangular white plate. In either case, the target may include a validation logo. The validation logo may be placed anywhere within the target in one example. For example, as shown in FIG. 1, the validation logo may be located on a black center of the one of the white circles within the black plate. For another example, as shown in FIG. 2, the validation logo may be overlapping one of the black circles within the white plate.

Figure 3A:
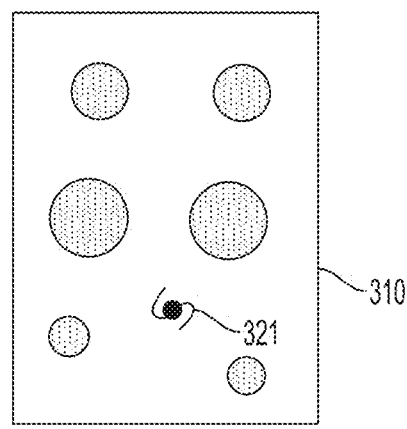
FIGS. 3A and 3B illustrate exemplary targets that may be installed on the passive heads of the wheel alignment system shown in FIG. 2.
Figure 3B:
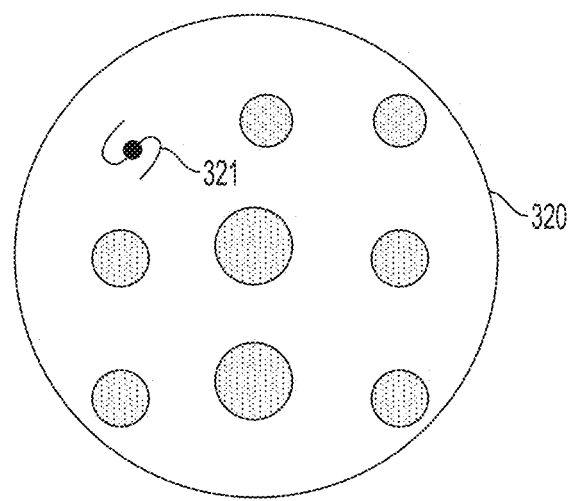

FIGS. 3A and 3B illustrate exemplary targets 310 and 320 that may be installed on the passive heads 222 and 224 of the wheel alignment system 210 of FIG. 2. The target 310 is a rectangular target; whereas, the target 320 is a circular target. In each case, the target may include a flat plate with a pattern of differently sized circles marked on or mounted on the surface of the plate in a pre-determined format and pattern. Among the patterns there is a unique validation logo 321 that may be unique and propriety. The validation logo 321 can be included in the target 310 and 320 to enable visual recognition of the propriety ownership of the vehicle wheel alignment system. In one specific example, the validation logo 321 may be created by Snap-on Incorporated ("Snap-on") and may be unique and proprietary mark of Snap-on and may be used to quickly identify the wheel alignment system is associated with Snap-on. In one implementation, the wheel alignment system may be configured to function only upon determining that such mark is present within the target. If the mark is for some reason removed from the target or altered (e.g., accidentally or due to the piracy of the vehicle wheel alignment system), the system will not function.

Although specific patterns are shown FIGS. 3A and 3B, it will be evident that a large number of different patterns can be used on each target. For example, a larger or smaller number of dots may be included and other sizes and shapes can be used for the dots. As another example, multifaceted plates or objects can also be used for the targets. Although a specific validation logo is shown, other unique validation logos may be designed and used on each target. For example, a validation logo may include the trademark of the company associated with the wheel alignment system. In keeping with the previous example, the trademark may include Snap-on.

Referring again to FIG. 2, the wheel alignment system 220 also includes a spatial relationship sensor associated with at least one of the active sensing heads 226 or 228. The spatial relationship sensor enables measurement of the spatial relationship between the active sensing heads 226 and 228 when the active sensing heads are mounted on wheels of the vehicle. In general, spatial relationship sensors may measure relative position and/or orientation, depending on the type of sensor used. A positional measurement refers to the relative position of the measured item from the perspective or in the coordinate system of the measuring device. Measurement of position generally uses a standard coordinate system such as Cartesian coordinates or polar coordinates. Orientation may be derived from a three-dimensional position measurement, or orientation may be measured independently of position. Orientation relates to the rotational position of the measured device with respect to the measuring device expressed in a standard coordinate system. Orientation is generally expressed in rotational angles in three orthogonal reference planes.

It will be readily apparent to someone skilled in the art that the wheel alignment systems discussed herein may be implemented with various different types of spatial relationship sensors. In this first example, the system uses two conventional (1D) angle sensors 240 and 242 to measure the relative angles of the active sensing heads 226 and 228, in the toe plane. The active heads 226 and 228 may also contain gravity sensors or the like to measure tilt, typically camber and pitch, of the head. The active heads 226 and 228 may also include title sensors 226a and 228a respectively.

The vehicle wheel alignment system 220 also includes a computer 250. The computer 250 may perform all or some of the processing related to target image processing. In one implementation, the computer 250 performs all of the processing associated with the target image processing. In another implementation, the computer 250 performs some of the processing associated with the target image and the active heads 226 and 228 perform other portions of the processing associated with the target image. In yet another implementation, the active heads 226 and 228 perform all of the processing associated with the target image processing.

In keeping with a scenario in which the computer processes at least some of the data related to target image processing, the computer 250 processes image data relating to observation of the targets and tilt data, from the active sensing heads. The computer 250 also processes spatial relationship data from the at least one spatial relationship sensor. The data processing enables computation of at least one measurement of the vehicle. In keeping with the previous example, the computer 250 may execute a logo validation process 100 shown in FIG. 1. To this end, the computer 250 may perform a projective transformation of the acquired image of the target as noted above. The projective transformation may include transforming the image of the target to match the orientation of the reference validation logo in the camera image plane. In one specific example, the projective transformation may make the image of the target "right-side-up" and normal with the camera image plane. The computer 250 may further process the transformed target image to identify a validation logo in the transformed target image. Once identified, the validation logo may be cropped from the target image. The computer 250 may then resize the cropped validation logo to be substantially the same size or the same size as the reference validation logo image as discussed further above. Once the validation logo sub-image is substantially the same size or the same size as the reference validation logo image, the computer 250 may compare them with each other to compute a similarity metric between the two images. In one specific example, the similarity metric may include the correlation coefficient discussed above with respect to FIG. 1.

Based on the correlation coefficient, the computer 250 determines whether there is a high degree of correlation between the validation logo sub-image and the reference validation log image. If there is a high degree of correlation between the validation logo sub-image and the reference validation logo image, then the computer 250 determines the validation logo is present in the target image and activates the functionality of the vehicle wheel alignment system 220. Otherwise, the computer 250 determines that the validation logo is not present in the target image and deactivates the functionality of the vehicle wheel alignment system 220.

Figure 4:
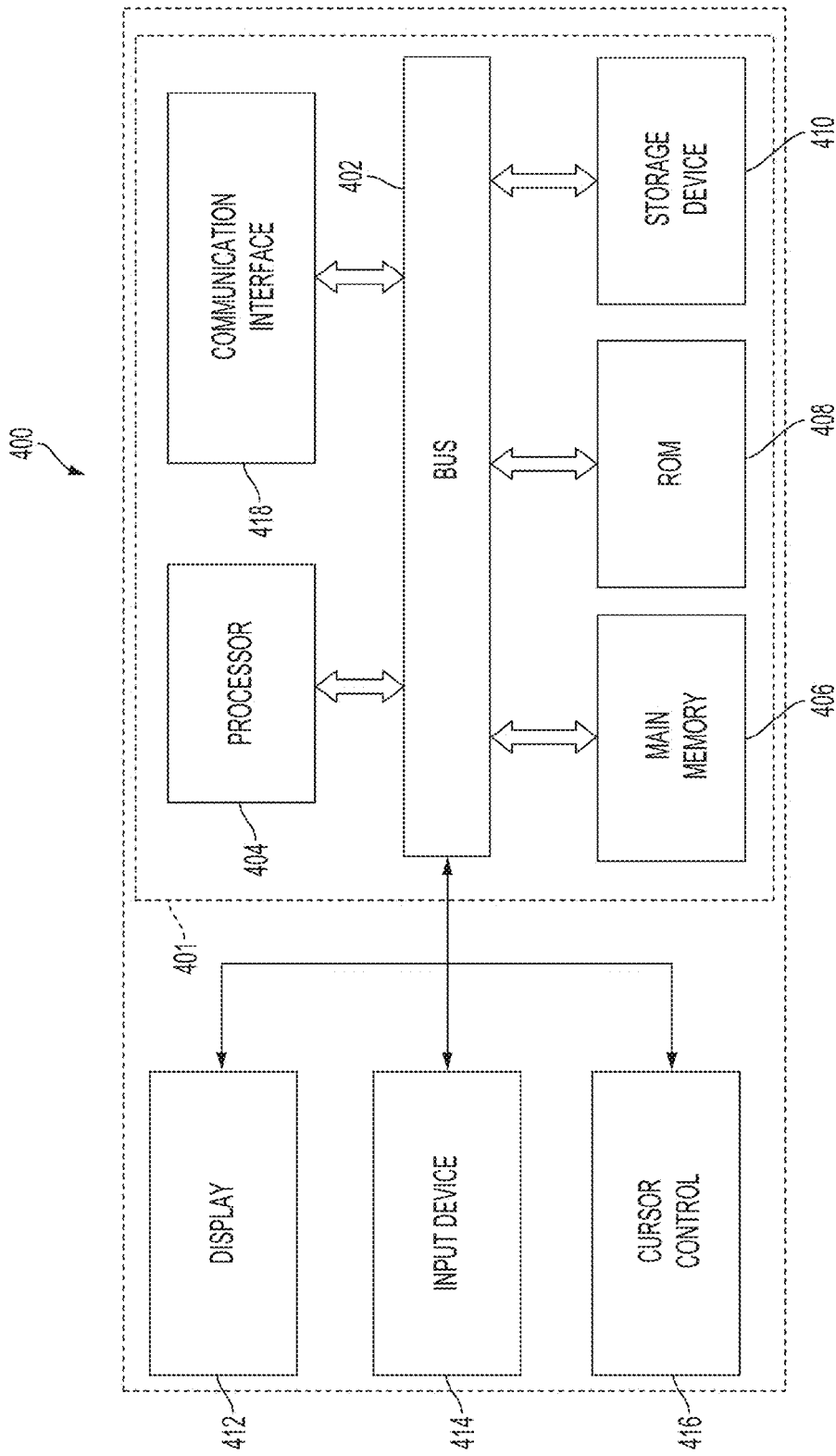
FIG. 4 illustrates in more details components of an exemplary computer that may be used in the vehicle wheel alignment system shown in FIG. 2.

FIG. 4 illustrates in more details components of an exemplary computer 400 that may be used in the vehicle wheel alignment system 220 shown in FIG. 2. The computer 400 processes data from the active sensing heads 226, 228 and provides the user interface for the wheel alignment system 220. The data processing could be done in a DSP or the like in one or more of the active sensing heads 226, 228. However, to minimize the cost of the heads 226 and 228, main processing power may be provided by the host computer system 400 (computer 250 in FIG. 2) or similar data processing equipment. In the example, the computer 400 may be implemented by a desktop type personal computer (PC) or other computer device such as a notebook computer, UMPC (ultra mobile PC), or similar device. A client server arrangement also could be used, in which case the server would perform the host processing and one of the active heads or another user device would act as a client to provide the user interface. Although those skilled in advanced wheel alignment technologies will be familiar with the components, programming and operation of various suitable computer systems, it may help to provide a brief example.

The computer 400 includes a central processing unit (CPU) 401 and associated elements for providing a user interface. The CPU section 401 includes a bus 402 or other communication mechanism for communicating information, and a processor 404 coupled with the bus 402 for processing information. The computer 400 also includes a main memory 406, such as a random access memory (RAM) or other dynamic storage device, coupled to bus 402 for storing information and instructions to be executed by processor 404. The instructions may include instructions for performing validation logo process. Main memory 406 also may be used for storing temporary variables or other intermediate information during execution of instructions by processor 404. The computer 400 further includes a read only memory (ROM) 408 or other static storage device coupled to bus 402 for storing static information and instructions for processor 404. A storage device 110, such as a magnetic disk or optical disk, is provided and coupled to bus 402 for storing information and instructions. Although only one is shown, many computer systems include two or more storage devices 410.

The illustrated implementation of the computer 400 also provides a local user interface, for example, so that the system appears as a personal computer or workstation as might be used in a wheel alignment bay or an auto service shop. The computer 400 may be coupled via bus 402 to a display 412, such as a cathode ray tube (CRT) or flat panel display, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404, which the CPU 401 in turn uses for controlling cursor movement on display 412. The cursor input device 416 typically has two degrees of freedom in two axes, a first axis (e.g., x) and a second axis (e.g., y), that allows the device to specify positions in a plane. The couplings between the user interface elements 412-416 and the CPU 401 may be wired or may use optical or radio frequency wireless communication technologies.

The CPU 401 also includes one or more input/output interfaces for communications, shown by way of example as an interface 418 for two-way data communications with the active sensing heads 226 and 227. For purpose of the wheel alignment application, the interface 418 allows the CPU to receive image data (including validation logo image), spatial relationship measurement data and tilt data from the active sensing heads 226 and 228. Typically, the interface 418 also allows the computer 400 to send operational commands and possibly software downloads to the active sensing heads 226 and 228. For example, the communications interface 418 may be a USB interface with a USB connector for cable connection to matching interfaces (not shown) in the active sensing heads 226, 228. Those skilled in the art will recognize that other data communications interfaces may be used in wheel alignment systems such as Ethernet, RS-232, RS-422, RS-485, WIFI or wireless Ethernet, Zigbee, Bluetooth, UWB. IrDA or any other suitable narrowband or broadband data communication technology.

Although not shown another communication interface may provide communication via a network, if desired. Such an additional interface may be a modem, an Ethernet card or any other appropriate data communications device. The physical links to and from the additional communication interface(s) may be optical, wired, or wireless.

Although the computer 400 may serve other purposes in the shop, the alignment system 220 uses the computer 400 for processing data from the heads 226, 228 to derive desired alignment measurements from the data provided by the heads, and to provide the user interface for the system 210. However, prior to performing the alignment functionality, the computer 400 may be configured to perform the logo validation process to ensure that the validation logo is present on the target image. Upon determining that the validation logo is present, the computer 400 then performs the wheel alignment functionality. Otherwise, the wheel alignment functionality may be disabled.

The computer system 400 typically runs a variety of applications programs and stores data, allowing one or more interactions via the user interface, provided through elements such as 412-416 to implement the desired processing. For wheel alignment applications, the programming may include appropriate code to process the data received from the particular implementation of the heads 426, 428, including (i) computations to derive desired vehicle wheel alignment measurement parameters from the various data from the heads 426 and 428; (ii) computations to calculate the correlation coefficient; (iii) the proper threshold measurement that should be matched or exceeded by the calculated correlation coefficient for the logo validation process; (iv) the proper measurements for resizing the validation logo sub-image to match the reference validation logo image; and/or (v) the proper measurements for projective transformation of the captured target image.

The computer 400 may typically run a general purpose operating system and an application or shell specifically adapted to perform the alignment related data processing and provide the user interface for input and output of desired information for alignment measurements and related services. Since it is a general purpose system, the computer 400 may run any one or more of a wide range of other desirable application programs. The components contained in the computer 400 are those typically found in general purpose computer systems used as servers, workstations, personal computers, network terminals, and the like. In fact, these components are intended to represent a broad category of such computer components that are well known in the art.

At various times, the relevant programming for the wheel alignment application may reside on one or more of several different media. For example, some or all of the programming may be stored on a hard disk or other type of storage device 410 and loaded into the Main Memory 406 in the CPU 401 for execution by the processor 404. The programming also may reside on or be transported by other media for uploading into the computer 400, to essentially install and/or upgrade the programming thereof. Hence, at different times all or portions of the executable code or data for any or all of the software elements may reside in physical media or be carried by electromagnetic media or be transported via a variety of different media to program the particular system and/or the electronics of the active sensing heads 226, 228. As used herein, terms such as computer or machine "readable medium" therefore refer to any medium that participates in providing instructions to a processor for execution. Such a medium may take many forms, including but not limited to, non-volatile media, volatile media, and transmission media (e.g. wires, fibers or the like) as well as signals of various types that may carry data or instructions between systems or between system components.

To summarize the concepts describe herein, a validation logo may be designed offline and prior to operation of a wheel alignment system. The validation logo may take variety of shapes and forms. In one specific example, the validation logo may be in the form of a stylized "X". Then, a reference template corresponding to a reference validation logo may be created and information about the reference template may be stored in the wheel alignment system. Furthermore, the pose (orientation an orientation) of the target may be identified. Once identified and after the target image is acquired, the target image may be protectively transformed based on the previously identified pose to match the orientation of the reference template in the wheel alignment system. Alternatively, a portion of the target image including the validation logo may be cropped first and then using the target pose information, a rectification transform on the that portion may be performed to transform the orientation of that specific portion of the target image to match the orientation of the reference template in the camera image plane. Since the target pose can be known, projective transformation can be performed accurately for any arbitrary target position and orientation. The cropped portion sub-image may be resized to match the reference template and a correlation coefficient between the resized sub-image and the stored template may be calculated. If the correlation coefficient indicates a high correlation, the wheel alignment system "passes" the security check and normal operation resumes. If the correlation coefficient does not indicate a high correlation, the wheel alignment system "fails" the security check and does not enable full aligner operation.

In one implementation, the resized cropped portion sub-image and the reference template may be binarized (e.g., converting pixels to 0 or 1 instead of a 0 to 255 intensity) since only grayscale information may be available and the image resizing may be easier and faster. In one implementation, the validation logo process may not take long and the user may not even notice that it is taking place. The validation logo process may take longer when the cropped portion sub-image is really large and it takes a while to remap the sub-image.

With the present teachings, identification of a pirated vehicle wheel alignment system can be simplified even if the shape and look of the wheel alignment system is changed to hide its piracy. For example, the manufacturer of the propriety wheel alignment system can identify the pirated wheel alignment system based on the unique logo on the target. Furthermore, a quick test can identify the pirated system that is modified to look very different from its original version to hide its piracy. Specifically, the copied system can be identified as cloned if it recognizes the validation logo and functions based on its recognition of the validation logo.

Other implementations are contemplated. For example, the valuation logo can take variety of shapes and forms and is not limited to the shape shown in FIGS. 3A and 3B. It may be an equation, for example or any other mark that can identify the propriety nature of the wheel alignment system. In yet another example, the validation logo may include series of vertices of any arbitrary shape. Similarly, the reference validation logo may take several forms. In one example as discussed above, the reference validation logo has the same shape as the validation logo included in the target image. In another example, the reference validation logo may be a number corresponding for example to a parameter of the validation logo included in the target. Assuming the validation logo is a circle, the parameter may include a radius of the circle.

For another example, there are various alternative methods which could be used to validate the presence of the reference validation logo in the target. A class of these methods is to develop image classification features which provide discernment between targets with the reference logo present and targets without the logo present. A computer could be trained to recognize the presence of the logo image features with various machine learning algorithms (e.g., neural networks, Bayesian classifiers, support vector machines, and others). Instead of discovering salient image features, one could use a "bag of words" classifier to train a processor to find distributions of statistically anomalous feature points in the logo image. At run time the image could be processed to look for a statistically similar collection of feature points and determine if the validation logo is present or not.

In addition, the projective image transformation step could be skipped entirely (at the cost of decreased end-user convenience). The end user could be prompted to position the target in the camera field of view such that it matches the orientation of the reference validation logo in the camera image plane (e.g., it is right-side up and normal to the image plane). In other words, the end user could be prompted to manually perform a projective transformation of the target. The projective transformation step can be skipped entirely by employing machine learning algorithms and classification features that are robust to projective transformations.

In the exemplary process depicted in this disclosure grayscale image intensities may be used as inputs to the correlation coefficient computation. It is important to note, however, that other types of images could be compared in this process (e.g., RGB images, binarized images, edge gradient intensity images, among others) without affecting the claims of this disclosure. It is also important to note that statistical similarity metrics other than correlation coefficient could be used to provide a robust similarity metric. One could use criteria like distribution of detected feature points, "fill" ratios, spatial covariances and associated medial axes, and various other methods to comprise statistical similarity metrics.

In yet another example, if the computed similarity metric reflects low similarity between the validation logo and the reference validation logo, the system may run the validation process again to make sure the result is indeed correct. The system may run this process a specific number (e.g., 2 or 3) times. Upon confirming that the computed similarity metric reflects low similarity between the validation logo and the reference validation logo, the system may advise the user to replace the target with a correct target. This information may be displayed on a user interface of the wheel alignment system.

In the examples discussed above, the active heads have been associated with the rear wheels, and the targets have been associated with the front wheels of the vehicle. However, those skilled in the art will understand that there are many variations of the basic configurations discussed above. For example, an arrangement similar to that of FIG. 1 in which the active heads and the target heads are reversed is contemplated. For another example, two active sensing heads may be mounted on one side of the vehicle, and two passive sensors may be mounted on the opposite side of the vehicle. Other arrangements of the active and passive heads are contemplated. Furthermore, the validation logo does not have to be present within the target area. It can be located outside of the target area as long as it is within the field of view of the camera. In one example, the validation logo may be located on the wheel alignment lift. In another example, the validation logo may be located on the wheel clamp or other elements on which the target is placed as long as it is within the field of view of the camera.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
acquiring via a vehicle wheel alignment system an image of a wheel alignment target,
wherein the wheel alignment target is mounted in association with a wheel of a vehicle, and includes a validation logo and a plurality of target reference points having known relative positions, the validation logo being used for recognition by the vehicle wheel alignment system and determination of authenticity of the validation logo by the vehicle wheel alignment system, and the plurality of target reference points being used to perform wheel alignment on the basis of observation of the plurality of target reference points having the known relative positions;
determining, on the basis of the positions of the target reference points in the acquired image of the wheel alignment target, a projective transformation relating the image of the wheel alignment target to a known orientation;
performing the determined projective transformation to facilitate comparison of the image of the wheel alignment target and the reference validation logo;
identifying the validation logo within the image of the wheel alignment target based on the performed projective transformation;
comparing the identified validation logo with a reference validation logo;
computing a similarity metric based on a result of a comparison between the identified validation logo and the reference validation logo;
based on the computed similarity metric, enabling or disabling the vehicle wheel alignment system; and
upon enabling the wheel alignment system, computing at least one measurement of the vehicle based on an image of the wheel alignment target including the validation logo acquired via a same image sensor of the vehicle wheel alignment system used to acquire the image used to identify the validation logo.

2. The method of claim 1, wherein acquiring the image of the target includes acquiring the image of the target via a camera of the vehicle wheel alignment system.

3. The method of claim 1, wherein the projective transformation includes transforming the image of the target to match an orientation of the reference validation logo in a camera image plane.

4. The method of claim 1, further comprising cropping the validation logo from the image of the target, wherein the validation logo is a copyrighted mark and distinct within the image of the target.

5. The method of claim 4, further comprising resizing the validation logo to be substantially same size as the reference validation logo.

6. The method of claim 4, further comprising resizing the validation logo to be same size as the reference validation logo.

7. The method of claim 1, wherein enabling or disabling the vehicle wheel alignment system includes enabling the vehicle wheel alignment system upon determining the similarity metric exceeds a threshold, confirming the validation logo authenticity.

8. The method of claim 1, wherein enabling or disabling the vehicle wheel alignment system includes disabling the vehicle wheel alignment system upon determining the similarity metric does not exceed a threshold, confirming the validation logo unauthenticity.

9. The method of claim 1, wherein computing the similarity metric includes computing a correlation coefficient based on the result of the comparison between the identified validation logo and the reference validation logo.

10. The method of claim 1, wherein the target is mounted to a wheel of the vehicle.

11. The method of claim 1, wherein the image of the wheel alignment target including the validation logo used to identify the validation logo is acquired via the same image sensor that is mounted in association with another wheel of the vehicle.

12. A wheel alignment system comprising:
   at least one processor; and
   a memory communicatively coupled to the at least one processor and storing executable instructions, wherein execution of the executable instructions by the at least one processor causes the at least one processor to perform functions to:
      acquire an image of a wheel alignment target, mounted in association with a wheel of a vehicle, including a validation logo and a plurality of target reference points having known relative positions, the validation logo being used for recognition by the vehicle wheel alignment system and determination of authenticity of the validation logo by the vehicle wheel alignment system, and the plurality of target reference points being used to perform wheel alignment on the basis of observation of the plurality of target reference points having the known relative positions;
      determine, on the basis of the positions of the target reference points in the acquired image of the wheel alignment target, a projective transformation relating the image of the wheel alignment target to a known orientation;
      perform the determined projective transformation to facilitate comparison of the image of the wheel alignment target and the reference validation logo;
      identify the validation logo within the image of the wheel alignment target based on the performed projective transformation;
      compare the identified validation logo with a reference validation logo;
      compute a similarity metric based on a result of a comparison between the identified validation logo and the reference validation logo;
      based on the computed similarity metric, enable or disable the vehicle wheel alignment system; and
      upon enabling the wheel alignment system, compute at least one measurement of the vehicle based on an image of the wheel alignment target including the validation logo acquired via a same image sensor of the vehicle wheel alignment system used to acquire the image used to identify the validation logo.

13. The wheel alignment system of claim 12, further comprising at least one camera, wherein to acquire the image of the target the memory further includes instructions for causing the at least one processor to acquire the image of the target via the at least one camera of the vehicle wheel alignment system.

14. The wheel alignment system of claim 12, wherein the projective transformation includes transforming the image of the target to match an orientation of the reference validation logo in a camera image plane.

15. The wheel alignment system of claim 12, wherein the memory further includes instructions for causing the at least one processor to crop the validation logo from the image of the target, the validation logo being a copyrighted mark and distinct within the image of the target.

16. The wheel alignment system of claim 15, wherein the memory further includes instructions for causing the at least one processor to resize the validation logo to be substantially same size as the reference validation logo.

17. The wheel alignment system of claim 12, wherein to enable or disable the vehicle wheel alignment system the memory further includes instructions for causing the at least one processor to enable the vehicle wheel alignment system upon determining the similarity metric coefficient exceeds a threshold, confirming the validation logo authenticity.

18. The wheel alignment system of claim 12, wherein to enable or disable the vehicle wheel alignment system the memory further includes instructions for causing the at least one processor to disable the vehicle wheel alignment system upon determining the similarity metric does not exceed a threshold, confirming the validation logo unauthenticity.

19. The wheel alignment system of claim 12, wherein to compute the similarity metric the memory further includes instructions for causing the at least one processor to compute a correlation coefficient based on the result of the comparison between the identified validation logo and the reference validation logo.

20. The system of claim 12, wherein the memory contains instructions for causing the at least one processor to acquire an image of a target mounted to a wheel of the vehicle.

21. The wheel alignment system of claim 12, wherein the image of the wheel alignment target including the validation logo used to identify the validation logo is acquired via the same image sensor that is mounted in association with another wheel of the vehicle.

22. A method comprising:
   acquiring via a vehicle wheel alignment system an image of a wheel alignment target, mounted in association with a wheel of a vehicle, used for aligning a vehicle, wherein the wheel alignment target includes a validation logo and a plurality of target reference points having known relative positions and used to perform wheel alignment on the basis of observation of the plurality of target reference points having the known relative positions;
   determining, on the basis of the positions of the target reference points in the acquired image of the wheel alignment target, a projective transformation relating the image of the wheel alignment target to a known orientation;
   performing the determined projective transformation to facilitate comparison of the image of the wheel alignment target and the reference validation logo;
   identifying the validation logo within the image of the wheel alignment target based on the performed projective transformation;
   determining whether the validation logo is present within the image of the wheel alignment target, the validation logo being used for recognition by the vehicle wheel alignment system and determination of a source of origin of the vehicle wheel alignment system;
   based on the determination result, enabling or disabling the vehicle wheel alignment system; and
   upon enabling the wheel alignment system, computing at least one measurement of the vehicle based on an image of the wheel alignment target including the validation logo acquired via a same image sensor of the vehicle wheel alignment system used to acquire the image used to determine whether the validation logo is present.

23. The method of claim 22, wherein acquiring the image of the target includes acquiring the image of the target via a camera of the vehicle wheel alignment system.

24. The method of claim 22, wherein determining whether the validation logo is present includes:
   identifying a portion of the image of the target that should contain the validation logo;

comparing properties of the identified portion with a reference validation logo;

computing a similarity metric based on a result of a comparison between the properties of the identified portion and the reference validation logo;

based on the computed similarity metric, determining whether the validation logo is present within the image of the target.

25. The method of claim 22, wherein the projective transformation includes transforming the image of the target to match an orientation of the reference validation logo in a camera image plane.

26. The method of claim 24, further comprising cropping the portion of the image of the target that should include the validation logo from the image of the target, wherein the validation logo is a copyrighted mark and distinct within the image of the target.

27. The method of claim 26, further comprising resizing the cropped portion to be same size as the reference validation logo.

28. The method of claim 24, wherein enabling or disabling the vehicle wheel alignment system includes enabling the vehicle wheel alignment system upon determining the similarity metric exceeds a threshold, determining the validation logo is present in the image of the target.

29. The method of claim 24, wherein enabling or disabling the vehicle wheel alignment system includes disabling the vehicle wheel alignment system upon determining the similarity metric does not exceed a threshold, determining the validation logo is not present in the image of the target.

30. The method of claim 22, wherein the target is mounted to a wheel of the vehicle.

31. The method of claim 22, wherein the image of the wheel alignment target including the validation logo used to identify the validation logo is acquired via the same image sensor that is mounted in association with another wheel of the vehicle.

* * * * *